United States Patent [19]
Koch

[11] 3,857,668
[45] Dec. 31, 1974

[54] FLAMELESS CATALYTIC COMBUSTION OF HYDROCARBON IN POROUS SINTERED STONES

[75] Inventor: Christian Koch, Erlangen, Germany

[73] Assignee: Siemens Aktiengesellschaft, Berlin and Munich, Germany

[22] Filed: July 21, 1970

[21] Appl. No.: 56,885

[30] Foreign Application Priority Data
Aug. 2, 1969 Germany.............................. 1939535

[52] U.S. Cl...................... 431/7, 431/328, 252/458
[51] Int. Cl............................................... F23d 3/40
[58] Field of Search .............. 431/7, 268, 328, 329; 23/2 E; 252/455, 458

[56] References Cited
UNITED STATES PATENTS

| | | | |
|---|---|---|---|
| 1,685,759 | 9/1928 | Walter | 431/328 UX |
| 1,978,198 | 10/1934 | Handforth | 23/470 X |
| 2,547,380 | 4/1951 | Fleck | 252/458 X |
| 2,958,648 | 11/1960 | Braithwaite | 252/455 R X |
| 3,161,227 | 12/1964 | Goss et al. | 431/328 |
| 3,302,689 | 2/1967 | Milligan | 431/328 |
| 3,441,359 | 4/1969 | Keith et al. | 431/328 |

Primary Examiner—Carroll B. Dority, Jr.
Attorney, Agent, or Firm—Herbert L. Lerner

[57] ABSTRACT

Process for the flameless combustion of gases in porous sintered stones. A hydrocarbon/air or hydrocarbon/oxygen mixture is catalytically burned in a highly porous nickel or platinum containing sintered stone provided with openings.

10 Claims, 3 Drawing Figures

FLAMELESS CATALYTIC COMBUSTION OF HYDROCARBON IN POROUS SINTERED STONES

The invention relates to a method for flameless catalytic combustion of hydrocarbons in porous sintered stones, as well as to a device for performing said method.

It is known, because of the good heat emission associated therewith, to use the heat radiation of solid bodies for heating purposes. Thus in Ullmanns Encyklopadie der technischen Chemie, Chemischer Apparatebau und Verfahrenstechnik, Volume 1, 1951, published by Urban and Schwarzenberg, Munich-Berline, page 188, there is described surface burners comprised of porous heat resistant stones, through which burns an air saturated combustion gas/air mixture. The stones begin to glow without the flames being visible. The disadvantage of these burners is in the fact that very high surface temperatures cannot be obtained with specific gas air mixtures, for example, with a gasoline vapor air mixture.

It is an object of the present invention to devise a method for flameless combustion of gases in porous sintered stones, which makes it possible to considerably increase the surface temperature and the specific thermal loading.

The solution of this task lies in catalytically burning a hydrocarbon air mixture or a hydrocarbon oxygen mixture in a highly porous sintered stone which contains nickel or platinum and which is provided with openings.

The invention is based on the recognition that the insertion of suitable catalysts will so accelerate the reaction speed of hydrocarbon air mixtures that the surface temperature will double and the thermal loading of the sintered stone will increase up to forty times. Thus, with gasoline vapor air mixtures, temperatures of 900°C up to 1400°C can be obtained on nickel containing sintered stones and temperatures up to 1650°C on platinum containing sintered stones. This result must certainly be considered surprising and could not have been derived from the prior art. When a gasoline vapor air mixture is burned on a nickel-free or platinum-free sintered stone, no stable, flameless combustion is obtained at an increased throughput. According to the invention, gaseous hydrocarbons or hydrocarbons which can be easily evaporated through preheating are used. Particularly suitable to this end are the hydrocarbons of formula $C_6H_{14}$ to $C_8H_{18}$, which at room temperature are fluids.

The original materials are employed, in association with nickel catalysts, preferably in a stoichiometric ratio, e.g. according to the equation:

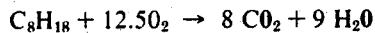
$$C_8H_{18} + 12.5O_2 \rightarrow 8\ CO_2 + 9\ H_2O$$

whereby the deviation of the oxygen content is possible upward as well as downward. A permanent excess of oxygen should be avoided in a nickel catalyst, due to the danger of inactivity, based on irreversible oxidation. If the hydrocarbons are burned with an air deficiency, the combustion gas which forms thereby may be subsequently burned with secondary air.

In platinum containing sintered stones, the ratio of the original products is adjusted to the desired temperature or the desired reaction process. Thus, the combustion may be effected with an excess or a deficiency of air. The air may be substituted by oxygen during the combustion in nickel and in platinum containing sintered stones, which results in a further increase in heat.

The sintered stones used for flameless combustion comprise a highly porous material, primarily with open pores, for example a sintered magnesium-aluminum silicate. In addition, they have openings which are preferably in a parallel arrangement. In the example, the openings have a pore radius of 0.5 mm with approximately 40 openings per $cm^2$ surface of sintered stones. The total pore volume should amount to at least 50 vol-% but is preferably around 65 vol-%. The additional openings prevent the clogging of the sintered stone by contamination and facilitate the throughput of the gas mixture, thus increasing the throughput considerably.

The installation of the nickel or platinum catalyst is effected in a known manner by saturating the sintered stones with a solution of nickel salt or platinum salt or a solution of a platinum acid. Suitable nickel salts are, for example, nickel acetate, nickel carbonate, to name a few. The platinum is preferably installed into the sintered stone in form of a solution of $H_2[PtCl_6]$. Naturally, other platinum compounds may be substituted for the $H_2[PtCl_6]$. The amount of nickel in the sintered stone may be 1 $mg/cm^3$ to 200 $mg/cm^3$, but may amount to more. An increase in the loading of the sintered stone could no longer be observed with nickel volumes of 500 $mg/cm^3$, 800 $mg/cm^3$ and more. Particularly suitable were found to be nickel volumes of 10 to 80 $mg/cm^3$. The amount of platinum installed is approximately around 0.1 to 100 $mg/cm^3$, preferably 5 to 10 $mg/cm^3$. It is essential for the selection of the catalyst salt, that the salt be thermally easy to decompose. Following its drying in air, but if necessary also by heat, the sintered stone may immediately be utilized as a radiation surface, in a suitable heating chamber.

In the embodiment examples, the gasoline vapor air mixture was sucked in by a fan from a carburetor, and compressed in a burner. After the flame is ignited in front of the sintered stone, said flame travels, after a short time, inside said sintered stone and may be maintained there without disturbance, for a long time, for example for many weeks. When the flame enters the sintered stone, the latter begins to glow brightly, whereby the heat is transmitted through radiation, as well as through convection, although the first heat radiation predominates.

The method of the invention for flameless catalytical combustion of hydrocarbons will be described in greater detail with respect to the drawing, in which.

Figure 1:
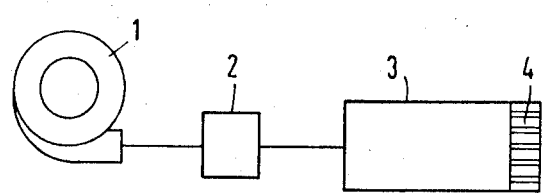
FIG. 1 shows apparatus for performance of the method.

In FIG. 1, a fan which sucks a benzinc/air mixture from a carburetor 2 and compresses it in a plate shaped burner 4, which is provided with a safety member 3. The burner is a sintered stone which is provided with bores and contains, as a catalyst, either nickel or platinum.

Figure 2:
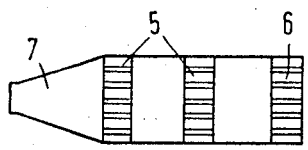
FIG. 2 is a cross section through a plate shaped burner.

FIG. 2 shows an embodiment of the invention which consists of the safety member, of the catalyst free sintered stones 5, whereby the combustion stone 6 is again a nickel or platinum containing sintered stone plate. At 7 is an inlet ring for introducing the gasoline air mixture or the gasoline oxygen mixture.

Figure 3:
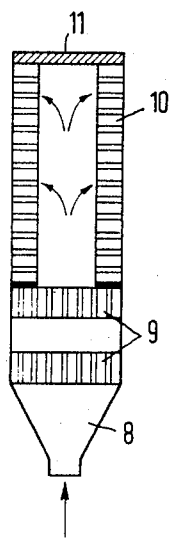
FIG. 3 is a cross section through a cylinder shaped burner.

FIG. 3 shows an additional embodiment wherein the benzine air mixture of the benzine oxygen mixture is guided via the guide ring 8 and the safety members 9, into the interior of a hollow cylinder 10, which according to the invention, consists of a catalyst containing sintered stone, so that the inserted gas mixture may be burned without a flame. In this way high temperatures may be generated along the cylinder wall in a very small area, which is required for many usages for example in the production of hydrogen through gasoline reforming for fuel elements. In FIG. 3, 11 depicts a cover plate connected with the hollow cylinder.

When a gasoline vapor air mixture in a stoichiometric ratio is burned in a sintered stone, wherein 50 mg/cm$^3$ nickel are uniformly distributed, depending upon the radiation ratio and gas mixture, a surface temperature is obtained of about 1100°C to 1450°C. During combustion in a sintered stone containing 5 to 10 mg/cm$^3$ platinum, the surface temperature may reach 1600°C.

According to a particularly preferred embodiment of the invention, the nickel and platinum salts used for forming catalysts are also doped with uranium compounds, so as to increase stability. The uranium compounds convert into uranium dioxide $UO_2$ during combustion which in this form helps to produce active centers in the catalyst. Additions of 1 to 3 wt-% uranium dioxide, relative to the catalyst content, are adequate for doping purposes.

The advantage gained over the known flameless radiation bodies lies above all in a complete combustion even in the smallest area without any or with very little air excess. Consequently, much higher temperatures can be obtained in this space, the throughput of the gas volume can be increased approximately 100 fold due to the catalytical reaction velocity.

I claim:
1. A process for the flameless combustion of gases in porous sintered stones, which comprises passing a mixture of hydrocarbon with air or oxygen through a highly porous sintered stone traversed by openings, said sintered stone containing a catalyst selected from the group consisting of nickel and platinum, said catalyst being doped with uranium oxide.
2. The process of claim 1, wherein the nickel content in the porous sintered stone is from 1 to 200 mg/cm$^3$.
3. The process of claim 1, wherein the nickel content in the porous sintered stone is from 10 to 80 mg/cm$^3$.
4. The process of claim 1, wherein the platinum content in the porous sintered stone is from 0.1 to 100 mg/cm$^3$.
5. The process of claim 1, wherein the platinum content in the porous sintered stone is from 5 to 10 mg/cm$^3$
6. The process of claim 1, wherein from 1 to 3 wt-% of uranium dioxide, based on the catalyst, is present.
7. The process of claim 1, wherein saturated aliphatic compounds from six to eight carbon atoms are said hydrocarbon.
8. The process of claim 1, wherein oxygen content in the gas mixture is less than that stoichiometrically required for combustion of the hydrocarbon and the incompletely burned gas is burned with secondary air.
9. A porous sintered stone for the flameless combustion of gases, which comprises a porous sintered stone traversed by openings, said sintered stone containing a catalyst selected from the group consisting of nickel and platinum, said catalyst being doped with uranium oxide.
10. The porous sintered stone of claim 9, wherein the base material is sintered magnesium-aluminum silicate.

* * * * *